L. H. PELTASON.
COMBINED CAN CONTAINER AND PERFORATOR.
APPLICATION FILED FEB. 17, 1913.
1,075,723.
Patented Oct. 14, 1913.
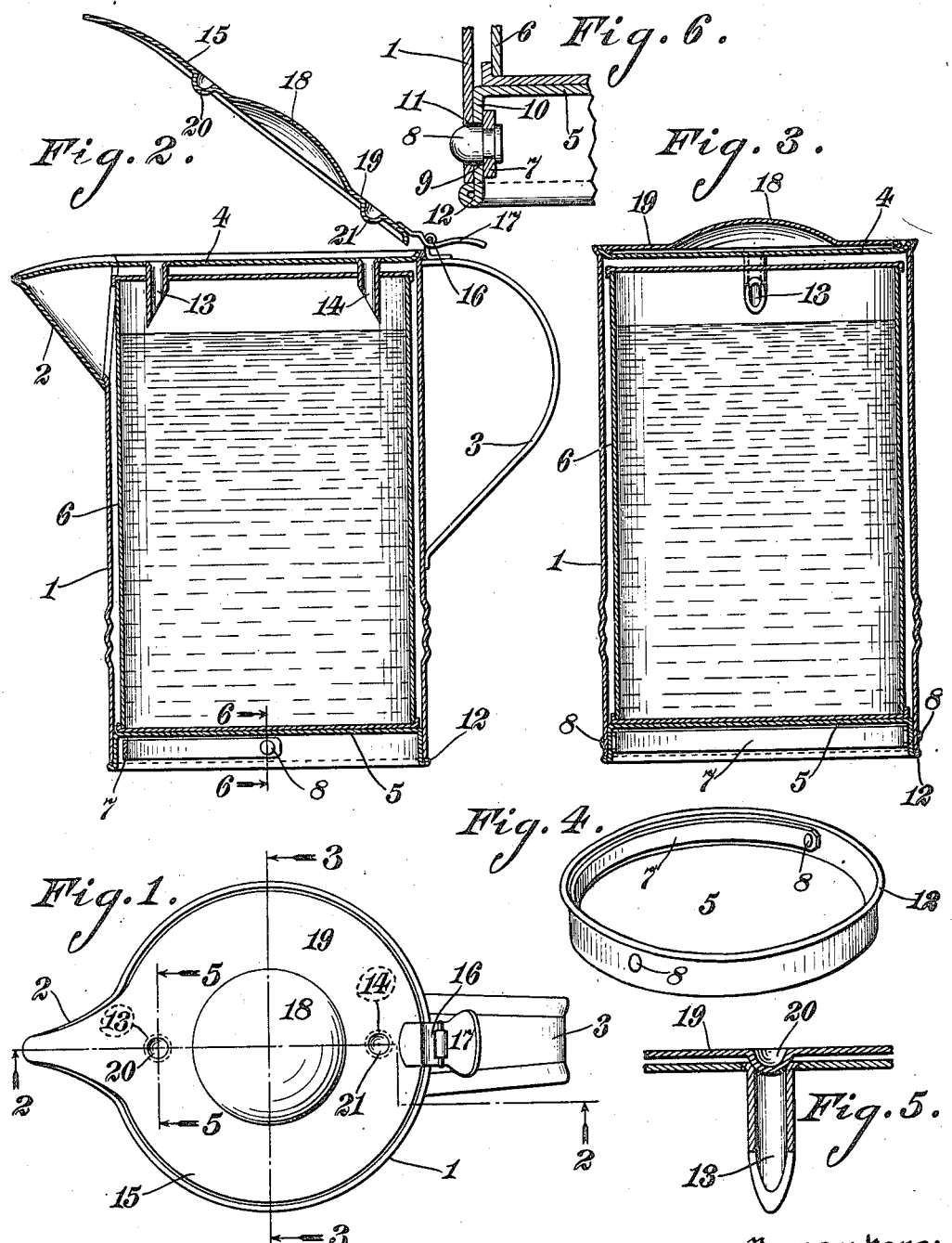

UNITED STATES PATENT OFFICE.

LEO H. PELTASON, OF ST. LOUIS, MISSOURI.

COMBINED CAN CONTAINER AND PERFORATOR.

1,075,723.  Specification of Letters Patent.  Patented Oct. 14, 1913.

Application filed February 17, 1913. Serial No. 748,783.

*To all whom it may concern:*

Be it known that I, LEO H. PELTASON, a citizen of the United States, residing at the city of St. Louis, State of Missouri, have invented certain new and useful Improvements in Combined Can Containers and Perforators, of which the following is a specification.

This invention relates to receptacles for inclosing condensed milk or other cans the contents of which evaporate or deteriorate when exposed to air, and has for its object to provide an improved receptacle of this character which has means for perforating the can while the latter is being inserted into same, so as to make an outlet for permitting the contents of the can to be poured out of same and an inlet for allowing air to enter the can during the pouring operation, the receptacle having a cover which bears means for opening the inlet and outlet during the pouring operation and, also, for closing the inlet and outlet after the completion of the pouring operation.

Another object of the present invention resides in the provision of a receptacle of the character described, one end of which has a removable closure, so that the can can be readily inserted into or removed from the receptacle.

Further, the present invention consists of the novel features of construction and arrangement of parts hereinafter more fully described and pointed out in the claims.

In the accompanying drawings forming part of this specification, in which like numbers of reference denote like parts wherever they occur, Figure 1 is a top plan view of an improved receptacle embodying the present invention; Fig. 2 is a sectional view on the line 2—2, Fig. 1, showing the cover in a raised position and a can in sectional view within the receptacle; Fig. 3 is a sectional view on the line 3—3, Fig. 1; Fig. 4 is a perspective view of the bottom of the receptacle, same being removed and inverted; Fig. 5 is a sectional view, on an enlarged scale, on the line 5—5, Fig. 1; and Fig. 6 is a sectional view, on an enlarged scale, on the line 6—6, Fig. 2.

In the drawings, 1 represents the body of the receptacle which may be either cylindrical, as illustrated, or any other desired shape and may have a pouring spout 2 and a handle 3. The upper ends of the receptacle 1 and the pouring spout 2 are closed by the top 4, which is soldered or otherwise secured thereto, and the lower end of the receptacle is closed by the bottom 5, which is preferably bell-shaped and is fitted into the lower end of said receptacle in such manner that same can be removed for the purpose of allowing a can 6 to be inserted into or removed from the receptacle.

In order to hold the bottom 5 of the receptacle 1 securely in place so that same will support the cam 6 within said receptacle and, also, so that same can be removed, when desired, a leaf spring 7 is preferably provided, each end of which spring has a pin 8 or the like riveted or otherwise secured thereto. The pins 8 extend outwardly through perforations 9, respectively, in the peripheral wall 10 of the bottom 5 and are forced outwardly by the spring 7, said perforations being preferably located substantially diametrically opposite each other. Perforations 11 in the receptacle 1 adjacent to the lower end thereof are also located substantially opposite each other, so as to register with the perforations 9, respectively, in the peripheral wall 10 of the bottom 5, when the latter is inserted into the open lower end of the receptacle. The pins 8 are of such length that, when the bottom 5 is inserted into the open lower end of the receptacle 1 so that the perforations 9 in the peripheral wall 10 of the bottom register with the perforations 11, respectively, in the receptacle, said pins will extend from the perforations 9 into the perforations 11, as best seen in Figs. 3 and 6, thereby holding the bottom 5 securely in place. An outwardly-turned rim or flange 12 on the lower edge of the bottom 5 engages the lower end of the receptacle 1 and thereby limits the inward movement of said bottom. The outer ends of the pins 8 may be rounded, as best seen in Fig. 6, so as to facilitate the removal of the bottom 5 from the lower end of the receptacle 1 or the insertion of said bottom into the lower end of said receptacle in an obvious manner.

The top 4 of the receptacle has a pouring nipple 13 and an air-inlet nipple 14 secured in openings therein in any suitable manner, which nipples extend downwardly from the top 4 and have their lower ends tapered or sharpened so that the same will pierce the top of the can 6, when the latter is inserted into the receptacle.

A cover 15 is preferably fastened to the handle 3 by means of a hinge 16, which has a thumb-lever 17 for opening and closing said cover, and is adapted to cover the top 4, when same is closed, as depicted in Fig. 1. Said cover is preferably provided with somewhat of a dome-shaped central portion 18, which is surrounded by a flat portion 19 having downwardly-projecting bosses 20 and 21, which bosses may be formed by striking depressions in the upper face of said flat portion. Said bosses 20 and 21 are so located with respect to the nipples 13 and 14, that, when the cover 15 is closed, said bosses will seat in the upper ends of said nipples, respectively, as depicted in Fig. 5, thereby closing said nipples, so as to prevent the contents of the can from evaporating or deteriorating, when not in use.

In using this receptacle, the bottom 5 is removed and a can 6 is then inserted into the open lower end of the receptacle, sufficient pressure being applied to the bottom of the can to cause the lower ends of the nipples 13 and 14 to pierce the top of the can, as depicted in Fig. 2, after which the bottom 5 is replaced, so as to support the can as hereinabove described. In order to pour out some of the contents of the can, the thumb-lever 17 of the hinge 16 is depressed so as to raise the cover 15, thereby moving the bosses 20 and 21 away from the nipples 13 and 14, after which the receptacle is tilted to cause the desired amount of the contents of the can to flow through the nipple 13, from which it flows over the portion of the top 4 that forms the top of the pouring spout 2, the necessary amount of air being admitted through the nipple 14 into the can. Upon the completion of the pouring operation, the receptacle is restored to its initial position, so that the bosses 20 and 21 will seat in and close the upper ends of the nipples 13 and 14 for the purpose hereinabove described.

Many minor changes in the details of construction and arrangement of parts may be made without departing from the nature and spirit of the present invention.

I claim:

1. A receptacle of the character described having a closed top and an open bottom, a pouring nipple and an air-inlet nipple projecting downwardly from the top of the receptacle adapted to perforate a can inserted into the receptacle, a closure for the bottom of the receptacle, and a hinged cover for the top of the receptacle having depending bosses which close said nipples when said cover is closed.

2. A receptacle of the character described having a closed top and an open bottom, a pouring nipple and an air-inlet nipple projecting downwardly from the top of the receptacle adapted to perforate a can inserted into the receptacle, a closure for the bottom of the receptacle, a hinged cover for the top of the receptacle having depending bosses which close said nipples when said cover is closed, and means carried by the hinge for opening and closing said cover.

3. A receptacle of the character described having an open bottom, a pouring spout, a handle, and a top which closes the upper end of same and said pouring spout, a removable closure for the bottom of the receptacle, means carried by the top for perforating a can inserted into the receptacle adapted to permit the discharge of the contents of the can, a cover hinged to the handle and having means for closing said perforating means when said cover is closed, and means borne by the hinge for opening and closing said cover.

4. A receptacle of the character described having a closed top and an open bottom, a closure for said open bottom, spaced hollow pouring means and air-inlet means projecting downwardly from said closed top, a hinged cover for the receptacle, and means rigidly connected to, and extending inwardly from the cover and bodily movable therewith for projection into and out of the upper ends of the interiors of each of the respective pouring and air inlet means, whereby the cover in its opening and closing movements automatically and simultaneously completely opens and closes each of the pouring and air-inlet means.

In testimony whereof I hereunto affix my signature in the presence of two witnesses.

LEO H. PELTASON.

Witnesses:
 GEORGE G. ANDERSON,
 WALTER C. GUELS.